United States Patent
Koo et al.

(10) Patent No.: US 8,792,881 B2
(45) Date of Patent: Jul. 29, 2014

(54) METHOD AND APPARATUS FOR DETERMINING CELL FOR EXECUTING COMP IN MULTI-CELL ENVIRONMENT

(75) Inventors: Ja-Ho Koo, Gyeonggi-Do (KR); Yeong-Hyeon Kwon, Gyeonggi-Do (KR); Jae-Hoon Chung, Gyeonggi-Do (KR); Bin-Chul Ihm, Gyeonggi-Do (KR); Hyun-Soo Ko, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 13/143,254

(22) PCT Filed: Dec. 31, 2009

(86) PCT No.: PCT/KR2009/008024
§ 371 (c)(1),
(2), (4) Date: Jul. 2, 2011

(87) PCT Pub. No.: WO2010/079926
PCT Pub. Date: Jul. 15, 2010

(65) Prior Publication Data
US 2011/0269459 A1    Nov. 3, 2011

Related U.S. Application Data

(60) Provisional application No. 61/142,641, filed on Jan. 6, 2009, provisional application No. 61/142,908, filed on Jan. 7, 2009, provisional application No. 61/150,326, filed on Feb. 6, 2009, provisional application No. 61/158,754, filed on Mar. 10, 2009, provisional application No. 61/163,467, filed on Mar. 26, 2009.

(30) Foreign Application Priority Data

Sep. 18, 2009    (KR) .......................... 10-2009-0088715

(51) Int. Cl.
*H04W 4/00*    (2009.01)

(52) U.S. Cl.
USPC .................... 455/432.1; 455/438; 455/452.2; 455/453; 370/332

(58) Field of Classification Search
USPC ............................ 455/432.1, 438, 452.2, 453
See application file for complete search history.

(56) References Cited

U.S. PATENT DOCUMENTS

| 2002/0058481 | A1 | 5/2002 | Mohebbi |
| 2008/0031368 | A1 | 2/2008 | Lindoff et al. |
| 2011/0183669 | A1* | 7/2011 | Kazmi ......................... 455/434 |
| 2011/0194632 | A1* | 8/2011 | Clerckx et al. ................ 375/260 |

FOREIGN PATENT DOCUMENTS

| JP | 2006-222913 | 8/2006 |
| KR | 10-0619658 B1 | 9/2006 |
| KR | 10-2008-0078648 | 8/2008 |

* cited by examiner

Primary Examiner — Wayne Cai
Assistant Examiner — Chuck Huynh
(74) Attorney, Agent, or Firm — Morgan, Lewis & Bockius LLP

(57) ABSTRACT

The present invention provides a method which determines an adjacent cell to carry out a coordinate multipoint transmission (CoMP) operation instead of performing the CoMP operation for all adjacent cells, in cases where precoding matrix indexes (PMI) of adjacent cells are limited to prevent interferences by adjacent cells in a multi-cell environment, thereby effectively reducing inter-cell interferences without causing an overhead.

7 Claims, 5 Drawing Sheets

METHOD AND APPARATUS FOR DETERMINING CELL FOR EXECUTING COMP IN MULTI-CELL ENVIRONMENT

The present application is a national stage of PCT International Application No. PCT/KR2009/008024, filed Dec. 31, 2009, and claims the benefit of U.S. Provisional Application Nos. 61/142,641, filed Jan. 6, 2009, 61/142,908, filed Jan. 7, 2009, 61/150,326, filed Feb. 6, 2009, 61/158,754, and filed Mar. 10, 2009, and 61/163,467, filed Mar. 26, 2009. The present national stage application also claims the benefit of Korean Patent Application No. 10-2009-0088715, filed Sep. 18, 2009.

BACKGROUND OF THE INVENTION

1. Field of the Invention

The present invention relates to wireless communication, and more particularly, to a method and apparatus for avoiding inter-cell interference in a multi-cell environment.

2. Description of the Related Art

In recent years, multiple input multiple output (MIMO) technology is primarily considered as one of technologies used in a next-generation mobile communication and wireless transmission system. The multiple input multiple output (MIMO) technology is a method for enhancing a spectral efficiency using multiple antennas to enhance a low spectral efficiency that has been a problem of the single input single output (SISO) method in the prior art.

The multiple input multiple output (MIMO) technology can be divided into a spatial multiplexing technique and a spatial diversity technique according to whether or not to transmit the same data.

The spatial multiplexing technique is a method for transmitting different data through several transmitting and receiving antennas at the same time. In other words, different data is transmitted through each transmitting antenna at the transmitter side, and suitable interference removal and signal processing is carried out for the received signals at the receiver side to obtain the transmitted data, thereby enhancing data transmission rate in proportion to the number of transmitting antennas.

The spatial diversity technique is a method for transmitting the same data through several transmitting antennas to obtain transmission diversity. In other words, the spatial diversity technique is a kind of space-time channel coding.

In such a spatial diversity technique, the same data is transmitted from several transmitting antennas, thereby greatly enhancing a transmission diversity gain. However, the spatial diversity technique is not a method for enhancing a transmission rate of data, but for enhancing the reliability of data transmission by enhancing a diversity gain.

Furthermore, the multiple input multiple output (MIMO) technology can be divided into an open loop method and a closed loop method according to whether information on channels is fed back from the receiver side to the transmitter side. Of them, the multiple input multiple output (MIMO) technology with a closed loop method may enhance a transmission rate of data using channel information fed back from the receiver side.

In other words, in case of a closed loop multiple input multiple output system, if transmission channel information has not been received from a terminal, then a base station may not know transmission channel information on a terminal being serviced. Accordingly, information on channels such as a channel quality indicator (CQI), a precoding matrix index (PMI), and the like is fed back from the terminal to the base station.

Currently, a lot of studies on a closed loop multiple input multiple output system are carried out, and the closed loop multiple input multiple output system is applied and used in a multi-cell environment as well as a single-cell environment. When a closed loop multiple input multiple output system is used in a multi-cell environment, each base station allocates a precoding matrix index (PMI) on the basis of an optimal codebook to a terminal based on a channel situation between the base station itself and each terminal to provide high-quality services to the terminal.

However, a terminal located at an edge of the cell may be interfered by a pre-codebook allocated to a terminal belonging to the adjacent cell by the base station of the adjacent cell because a signal from the base station of the cell to which the terminal itself belongs is weak. The terminal located at an edge of the cell may have a problem of deteriorating the performance thereof due to inter-cell interference.

A coordinated multi-point (CoMP) transmission method has been developed to reduce interference phenomenon between cells in a multi-cell environment. The coordinated multi-point (CoMP) transmission method has been developed to reduce inter-cell interference in a multi-cell environment and enhance the communication performance of the terminal located at an edge of the cell.

However, in case where a method of limiting the PMI of the adjacent cell is required to perform coordinated multi-point (CoMP) transmission, it should be determined which PMIs are to be limited when there exist a plurality of PMIs to be limited due to interference from several adjacent cells. At this time, there is a problem of causing an overhead in case where PMIs of all the adjacent cells are taken into consideration.

Accordingly, it is needed to solve to which cells the PMI limitation will be applied.

SUMMARY OF THE INVENTION

The present invention is contrived to solve the foregoing problems, and an object of the present invention is to provide a method and apparatus for limiting a cell to perform coordinated multi-point (CoMP) transmission among cells adjacent to a terminal and determining PMIs to be limited when PMIs required to be limited are competed among the limited cells, thereby preventing an overhead of the system.

Another object of the present invention is to provide a method and apparatus for limiting a cell to perform coordinated multi-point (CoMP) transmission among cells adjacent to a terminal and determining PMIs to be limited when PMIs required to be limited are competed among the limited cells, thereby preventing an overhead of the system as well as effectively reducing interference phenomenon due to the adjacent cells.

In order to accomplish the foregoing objective, according to the present invention, there is provided a CoMP execution cell determination method and apparatus for limiting an adjacent cell to perform coordinated multi-point (CoMP) transmission when PMIs are limited to prevent an interference effect due to adjacent cells in a multi-cell environment, thereby effectively reducing the interference effect without causing an overhead.

The foregoing method in a wireless communication system for performing coordinated multi-point transmission in a multi-cell environment may include directing a terminal to collect first measurement information on adjacent cells, receiving the first measurement information on adjacent cells from the terminal to prepare a candidate cell list to perform coordinated multi-point (CoMP) transmission based on the first measurement information, transmitting the prepared candidate cell list to the terminal and instructing the terminal to collect second measurement information on candidate cells included in the candidate cell list to perform coordinated multi-point transmission, receiving the second measurement information from the terminal and determining an adjacent cell to perform coordinated multi-point transmission in a range of predetermined number of cells based on the received second measurement information, and transmitting information on the determined adjacent cells to the terminal, The foregoing method in a wireless communication system for performing coordinated multi-point transmission in a multi-cell environment may include directing a terminal to collect first measurement information on adjacent cells, receiving the measurement information on adjacent cells from the terminal to determine a cell to perform coordinated multi-point (CoMP) transmission based on the measurement information or network parameter, and transmitting information on the determined adjacent cells to the terminal.

The foregoing method in a wireless communication apparatus for performing coordinated multi-point transmission in a multi-cell environment may include receiving a command for collecting communication environment measurement information on adjacent cells from a serving base station, measuring the collected communication environment on adjacent cells to transmit the measurement information to the serving base station, receiving a list of cells to perform coordinated multi-point transmission from the serving base station, receiving a feedback on the PMI information of adjacent cells included in the list of cells to perform coordinated multi-point transmission from an adjacent base station, and transmitting the PMI information to the serving base station.

The foregoing method in a wireless communication apparatus for performing coordinated multi-point transmission in a multi-cell environment may include receiving a command for collecting communication environment measurement information on adjacent cells from a serving base station, preparing a list for adjacent cells to perform coordinated multi-point transmission on the basis of the collected communication environment measurement information on adjacent cells, receiving a feedback on PMI information for the prepared adjacent cells from an adjacent base station, and transmitting the PMI information to the serving base station.

The foregoing apparatus in a wireless communication apparatus for performing coordinated multi-point transmission in a multi-cell environment may include a transmitter configured to transmit data to a serving base station and an adjacent base station, a receiver configured to receive data from the serving base station and adjacent base station, and a processor configured to control the data transmission and reception of the transmitter and receiver, wherein the transmitter allows a base station of the serving cell to transmit a command for instructing a terminal to collect first communication environment measurement information on adjacent cells, and the receiver allows the base station of the serving cell to receive the communication environment measurement information on adjacent cells from a terminal, and the processor prepares a candidate cell list to perform coordinated multi-point (CoMP) transmission based on the communication environment information received from the terminal, and the transmitter allows the base station of the serving cell to transmit the prepared candidate cell list to the terminal and transmits a command for instructing to collect second communication environment measurement information on cells in the candidate cell list, and the processor allows the base station of the serving cell to receive the second communication environment measurement information from the terminal and determines an adjacent cell to perform coordinated multi-point transmission on the basis of the received second communication environment measurement information, and the transmitter allows the base station of the serving cell to transmit information on the determined adjacent cells to the terminal.

The foregoing method in a wireless communication system for performing coordinated multi-point transmission in a multi-cell environment may include collecting parameter information on adjacent cells, preparing a candidate cell list to perform coordinated multi-point (CoMP) transmission based on the parameter information on adjacent cells, transmitting the prepared candidate cell list to the terminal and instructing the terminal to collect measurement information on candidate cells included in the candidate cell list to perform coordinated multi-point transmission, and receiving an adjacent cell list to perform coordinated multi-point transmission determined by the terminal based on the measurement information from the terminal.

The foregoing method in a wireless communication system for performing coordinated multi-point transmission in a multi-cell environment may include collecting parameter information on adjacent cells, preparing a candidate cell list to perform coordinated multi-point (CoMP) transmission based on the parameter information on adjacent cells, transmitting the prepared candidate cell list to the terminal and instructing the terminal to collect measurement information on candidate cells included in the candidate cell list to perform coordinated multi-point transmission, and receiving the measurement information from the terminal to determine an adjacent cell list to perform coordinated multi-point transmission.

According to the present invention, a precoding matrix index (PMI) on the basis of a codebook may be received to configure a list of adjacent cells to perform coordinated multi-point transmission, thereby having an effect of preventing an overhead.

According to the present invention, an adjacent cell causing interference phenomenon to a terminal located at an edge of the cell may be determined to limit the use of a precoding vector of the adjacent cell and use a sub-optimal codebook vector, thereby enhancing the performance of the entire cell as well as that of the terminal located at an edge of the cell.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, preferred embodiments of the present invention will be described in detail with reference to the accompanying drawings. It should be noted that the same reference numerals are designated to the same procedures and constituent elements even though they are shown in the other drawings in adding reference numerals to procedures, respectively, in the flow chart of each drawing or adding reference numerals to constituent elements in the drawing.

Furthermore, a lot of detailed specific matters are illustrated in the following description, but they are only provided to help general understanding of the present disclosure, and it should be understood by those skilled in the art that the present invention can be carried out without those specific matters. In describing the present invention, moreover, the detailed description will be omitted when a specific description for publicly known technologies to which the invention pertains is judged to obscure the gist of the present invention.

Embodiments of the present disclosure are described mainly in relation to the transmission and reception of data between a base station and a mobile station. Here, the base station functions as a terminal node of a network, which directly performs communication with the terminal. In this embodiment, part of a specific operation or processing described to be performed by a base station may be carried out by an upper node of the base station if necessary.

Furthermore, in this embodiment, the term "base station" may be replaced by a term such as fixed station, Node B, eNode B (eNB), access point, or the like. Furthermore, the term "terminal" may be replaced by a term such as user equipment (UE), mobile station (MS), mobile subscriber station (MSS), or the like.

Figure 1:
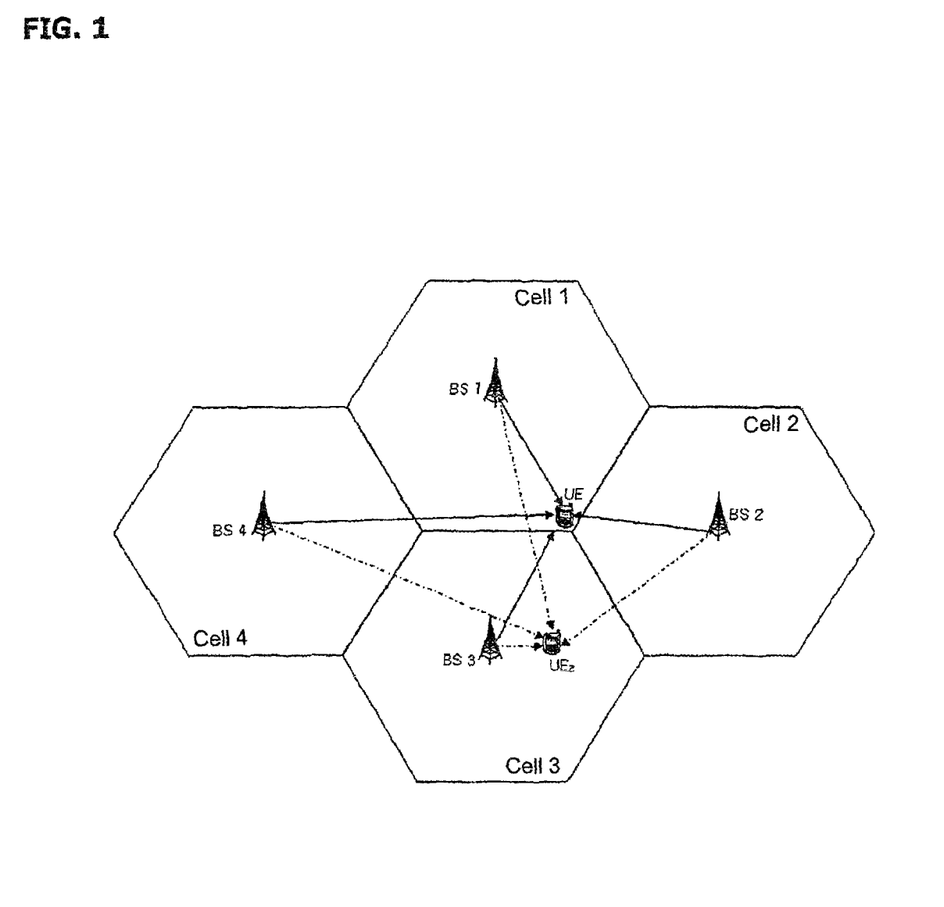
FIG. 1 is a view illustrating a situation in which interference due to an adjacent cell is generated at a terminal located within a specific cell in a multi-cell environment.

First, a phenomenon of generating interference due to a cell adjacent to a terminal located within a specific cell in a multi-cell environment will be described with reference to FIG. 1. FIG. 1 is a view illustrating a situation in which interference due to an adjacent cell is generated at a terminal located within a specific cell in a multi-cell environment.

In FIG. 1, terminal 1 ($UE_1$) located at an edge of cell 1 may have very weak receiving signals since it is far apart from serving base station 1 (BS 1). Furthermore, terminal 1 ($UE_1$) may exhibit a poor reception performance due to interference by an adjacent cell since it is located at an edge portion to adjacent cells (i.e., cell 1, cell 3, and cell 4).

On the contrary, terminal 2 ($UE_2$) located at an inner side of the cell in cell 3 may have a very good receiving signal strength since it is located at a physically close distance from base station 3 (BS 3). Furthermore, though terminal 2 ($UE_2$) is affected by interference due to adjacent cells (i.e., cell 1, cell 2, and cell 4), the reception performance thereof may be little affected since signal strengths from the adjacent cells are weak.

As described above, a terminal (for example, $UE_1$) located at an edge of the cell may be more affected by interference due to adjacent cells compared to a terminal (for example, $UE_2$) closely located to the base station of the cell, thereby deteriorating the reception performance.

In a closed loop multiple input multiple output system in such a multi-cell environment, the base station (for example, BS 1, BS 2, BS 3, and BS 4) in each cell transmits data to the terminal using a codebook. The codebook may be a same codebook or may be different from one another.

At this time, in each cell, data is transmitted by using an optimal precoding vector for each terminal based on a channel state between the base station and the terminal. However, precoding vectors used for each terminal may have correlations to one another because they are not completely independent from one another, and moreover, beam patterns by precoding vectors may have an effect on one another.

Accordingly, when a terminal within a serving cell receives data using an optimal precoding vector suitable to the channel situation from the serving base station, a terminal located at an edge of the serving cell may be affected by an optimal precoding vector used by the base station of an adjacent cell as well as the serving base station. Owing to this, the terminal located at an edge of the serving cell may be affected by inter-cell interference due to an optimal precoding vector used by the base station of the adjacent cell.

In order to reduce inter-cell interference in such a multi-cell environment, precoding matrix indexes (PMIs) not to be used by the adjacent cell causing interference are grasped, and thus the adjacent cell should not be allowed to use the relevant PMI. However, the number of collected PMIs of adjacent cells increase when there exist multiple adjacent cells affecting interference, thereby causing an overhead if all the collected information is processed.

As a result, according to the present invention, there is proposed a method for previously preparing a candidate list of adjacent cells to perform coordinated multi-point (CoMP) transmission and then determining an adjacent cell to perform coordinated multi-point (CoMP) transmission based on the list, or immediately determining an adjacent cell to perform CoMP without generating a candidate list of adjacent cells to perform CoMP, thereby preventing an overhead.

To this end, it should be first determined which terminal within a cell will perform coordinated multi-point (CoMP) transmission. When there are several terminals within a serving cell, CoMP may be carried out for all terminals, or CoMP may be carried out only for a terminal having no good channel quality among terminals within a cell.

When CoMP is carried out for all terminals, each terminal may automatically collect PMI information on all adjacent cells causing interference to the terminal itself, and thus the serving base station may be not required to trigger the terminal to collect PMI information on adjacent cells. However, in this case, even a terminal having a good channel state may collect PMI information on adjacent cells, thereby causing an overhead.

Contrary to the foregoing method, CoMP may be carried out only for a terminal having a no good channel state among terminals within a cell, which may be a terminal located at an edge of the cell. The terminal may collect communication environment information of an adjacent cell according to a CoMP command of the serving base station, and thus limiting terminals may be also required to prevent an overhead due to PMI limitations.

For which terminal within a serving cell can perform coordinated multi-point (CoMP) transmission, 1) there is a method for allowing the base station to determine a terminal to perform CoMP, and 2) a terminal may determine for itself to perform CoMP and then request the serving base station to perform CoMP.

In case where the base station determines a terminal to perform coordinated multi-point (CoMP) transmission, the serving base station may decide a predetermined ratio of terminals as terminals located at an edge of the cell through channel quality indicator (CQI) reporting information received from all terminals within the relevant cell, or may predefine a specific threshold value to decide a terminal located at an edge of the cell when the received channel quality indicator (CQI) reporting information value for each terminal does not satisfy the threshold value. It may be also possible to request to perform CoMP by deciding it as a terminal located at an edge of the cell on the basis of channel quality indicator (CQI) reporting information between the serving base station and the terminal as well as communication environment measurement information between each terminal and adjacent cells transmitted to the serving base station.

Such a request to perform CoMP may be periodically implemented or may be implemented whenever a terminal to perform CoMP is initially made if CoMP should be carried out by terminals greater than a specific number.

Next, in case where a terminal determines for itself to perform CoMP, the serving base station may notify a specific threshold value to a terminal, and the terminal may compare communication environment information such as channel quality indicator (CQI) information measured for the serving base station or adjacent base station with the previously received threshold value to determine whether to perform CoMP and request the serving base station to perform CoMP.

For example, when a terminal that has determined to perform CoMP sends a scheduling request to the serving base station and receives an approval message from the serving base station, the terminal may request the serving base station to perform CoMP through a radio resource control (RRC) message, or transmit trigger information for performing CoMP at a specific time through a physical uplink control channel (PUCCH) or physical uplink shared channel (PUSCH). For example, the terminal may transmit the information of 1-bit to trigger CoMP execution at a specific timing while transmitting the channel quality indicator (CQI), PMI, and ranking information (RI) of the terminal with respect to the serving base station through physical uplink control channel (PUCCH) format 2/2a/2b.

If a terminal to perform CoMP is determined to measure PMI information for an adjacent base station through the foregoing method, then a cell to perform CoMP may be determined on the basis of the collected information.

For a method of determining a cell to perform CoMP, 1) a method of preparing a cell candidate list (hereinafter, "CoMP cell candidate list") to perform CoMP, and then determining a predetermined cell among cells within the list as a CoMP execution cell, and 2) a method of directly determining a CoMP execution cell among adjacent cells without preparing the CoMP cell candidate list may be taken into account.

First, as an embodiment of the present invention, the method of preparing a CoMP cell candidate list and determining as a CoMP execution cell among adjacent cells in the candidate list will be described.

The method of preparing CoMP cell candidate list may be divided into a method of making a CoMP cell candidate list based on an adjacent cell measurement value by the terminal and a method of making a CoMP cell candidate list on the basis of a specific parameter of the adjacent base station.

Hereinafter, the method of preparing a CoMP cell candidate list based on a measurement value for an adjacent cell of the terminal and then determining a CoMP execution cell based on this list will be described.

Figure 2:
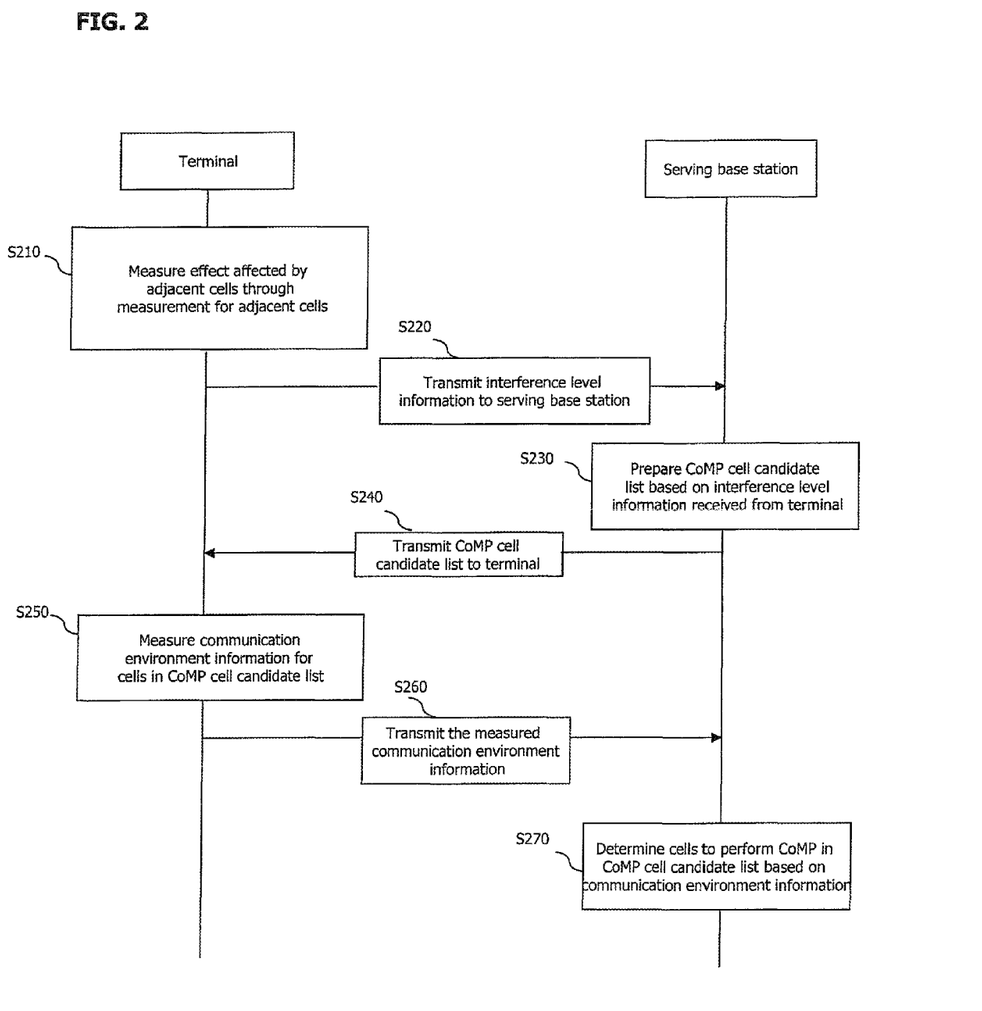
FIG. 2 is a flow chart for explaining a method of making a CoMP cell candidate list based on an adjacent cell measurement value by a terminal as well as determining a cell to perform CoMP among cells in the list according to an embodiment of the present invention.

FIG. 2 is a flow chart for explaining a method of making a CoMP cell candidate list based on an adjacent cell measurement value by a terminal as well as determining a cell to perform CoMP among cells in the list according to an embodiment of the present invention.

Referring to FIG. 2, first, the terminal measures an interference level at which adjacent cells give an effect on the terminal through the measurement for adjacent cells (S210). For the method of determining adjacent cells for the measurement, the terminal may receive a list for adjacent cells of the relevant terminal in advance from the serving base station, or the terminal may directly form a list through an interference level due to adjacent cells.

At this time, the signals used to measure an interference level may include a channel quality indicator (CQI), reference symbol received power (RSRP), reference symbol received quality (RSRQ), a reference signal strength indicator (RSSI), a carrier to interference plus noise ratio (CINR), a signal to interference noise ratio (SINR), a propagation delay (PD), and the like. In other words, an interference level by the relevant adjacent cell may be decided by comparing the signal measured for the adjacent cell with a signal received from the serving cell.

Then, the terminal transmits information on an interference level obtained through the measurement to the serving base station (S220). When terminal directly determines an adjacent cell list through the measurement for adjacent cells, the transmitted information may include at least one measurement value and cell ID. Here, the cell ID may use at least one of a physical cell ID and a global cell ID.

On the contrary, when the base station provides a list on adjacent cells in advance to the terminal, the terminal may transmit a measurement value of the relevant cell in a predefined cell ID order or transmit an index and measurement value corresponding to the cell ID. Of course, it may be possible to transmit in the largest interference level order in addition to the predefined order.

The serving base station that has received interference information by adjacent cells from the terminal prepares a CoMP cell candidate list based on this information (S230). For example, in preparing a CoMP cell candidate list, the serving base station may determine a cell having a greater interference effect on the terminal by comparing the channel quality indicators or signal to interference noise ratios of the adjacent cells with one another.

On the other hand, when the propagation delay of the adjacent cell exceeds the cyclic prefix (CP) of the serving base station, the terminal may remove the relevant adjacent cell from the CoMP cell candidate list. In this manner, the method of removing the relevant adjacent cell from the CoMP cell candidate list using a propagation delay (PD) may be more usefully used when performing joint processing on the basis of data sharing.

In other words, the terminal located at an edge of the cell in joint processing may receive a more strengthened signal through a multi-cell based signal according to the sharing of data and Channel State Information (CSI). However, when a signal of the adjacent cell is received at the terminal subsequent to being subject to a propagation delay (PD) exceeding the CP of the serving cell, the terminal receives the signal by recognizing it as an interference signal. Accordingly, when the PD of the adjacent cell exceeds the CP of the serving cell, the relevant adjacent cell may be removed from the CoMP cell candidate list (CoMP candidate set).

If a CoMP cell candidate list is prepared through the foregoing method, then whether to perform CoMP will be taken into consideration afterwards only for a cell in the list.

Then, the serving base station transfers the prepared CoMP cell candidate list to the terminal (S240).

In order to determine an adjacent cell currently having a severe interference among cells in the CoMP cell candidate list received from the serving base station, the terminal measures communication environment information for cells included in the received CoMP cell candidate list (S250).

If the measurement for cells included in the CoMP cell candidate list is completed, then the terminal transmits the measurement to the serving base station (S260).

Then, the base station prepares a CoMP execution cell list consisting of cells having a severe interference level among cells included in the CoMP cell candidate list based on the measured communication environment information (S270).

As described above, the serving base station can receive information from the terminal to determine a CoMP execution cell list, but the present invention will not be limited to this, and the terminal may directly determine a CoMP execution cell list. In other words, the terminal may directly determine a CoMP execution cell list by an interference level based on communication environment information measured for adjacent cells in a CoMP cell candidate list. In this manner, when a CoMP execution cell list is determined by a terminal, the determined CoMP execution cell list may be transferred to the serving base station by the terminal afterwards.

As an example of the method of preparing a CoMP execution cell list, the terminal may determine the number of cells currently performing CoMP on the basis of a predetermined threshold value, and if the number of cells is determined, then a cell to perform CoMP may be indicated in the severest interference order. At this time, the threshold value may be notified to the terminal by the base station or initially prefixed at the terminal.

Furthermore, the base station may predefine the maximum number of cells capable of performing CoMP and determine the number of cells performing CoMP on the basis of the predefined maximum number of cells and threshold value. In other words, when the number of CoMP cells exceeding a threshold value exceeds a predefined maximum number of cells, the base station indicates a CoMP execution cell list only for the predefined maximum number of cells. On the other hand, the base station may predefine a fixed number of cells and configure adjacent cells corresponding to the predefined number of cells as a CoMP execution cell list on the basis of a measurement value of the terminal.

As described above, when configuring a CoMP cell candidate list on the basis of a measurement value of the terminal, it may have an effect of enhancing flexibility compared to when configuring a CoMP cell candidate list using a specific parameter of the adjacent base station which will be described later.

Next, according to another embodiment of the present invention, a method of using a specific parameter of the adjacent base station to prepare a CoMP cell candidate list will be described.

Figure 3:
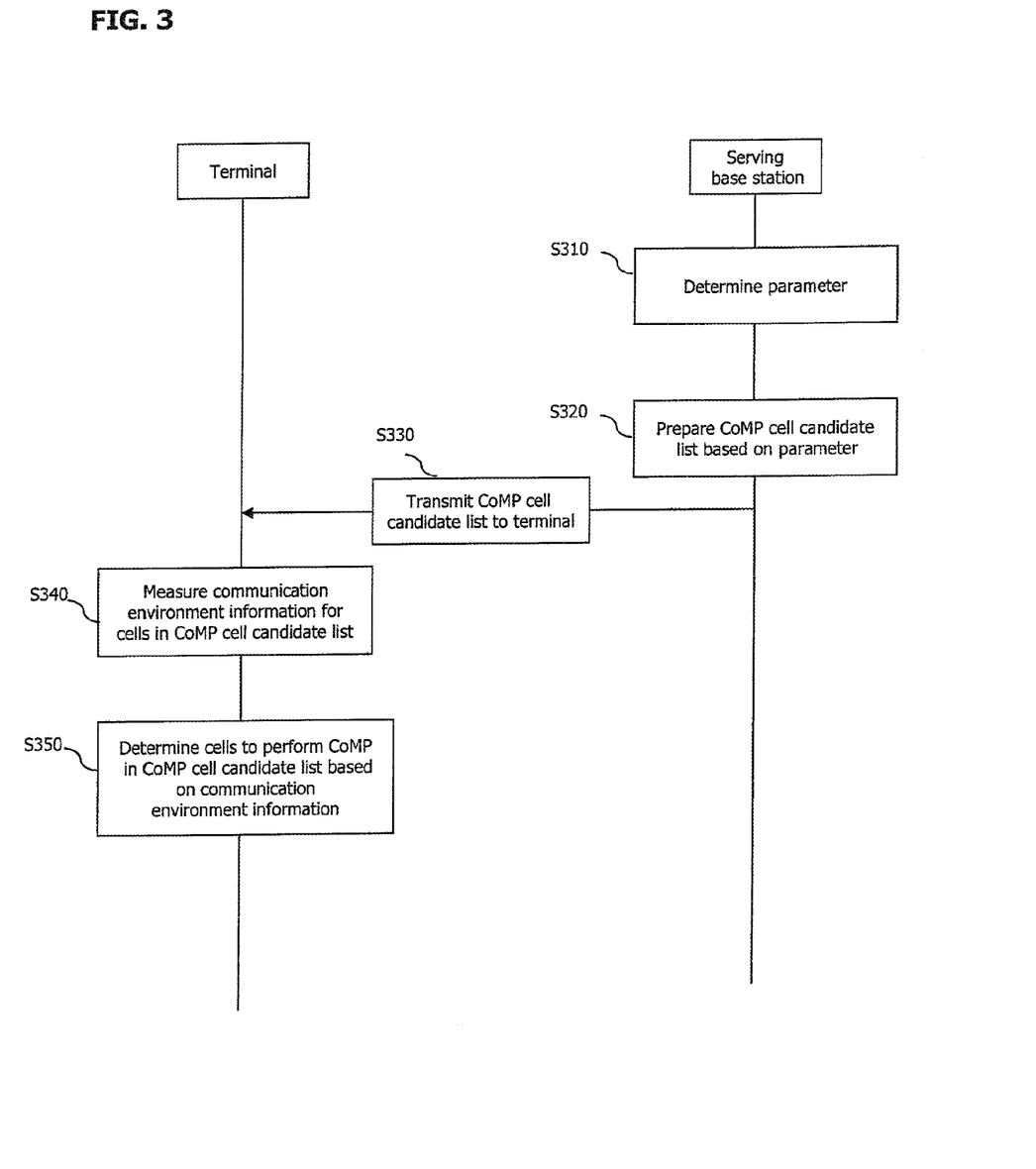
FIG. 3 is a flow chart for explaining a method of preparing a CoMP cell candidate list using a network parameter according to another embodiment of the present invention.

FIG. 3 is a flow chart for explaining a method of preparing a CoMP cell candidate list using a specific parameter of the adjacent base station according to another embodiment of the present invention.

Referring to FIG. 3, first, the serving base station determines a specific parameter (S310), and combines cells having the same or similar parameter into a group, and determines CoMP candidate cells to prepare a CoMP cell candidate list (S320).

Here, the parameter may include an adjacent cell having the same v-shift of Cell-specific Reference Signal (CRS), an adjacent cell having the same number of antennas, an adjacent cell having the same rank, an adjacent cell having the same v-shift of Demodulation Reference Signal (DRS), an adjacent cell having a close geostrategic location, an adjacent cell for which the propagation delay (PD) is less than a cyclic prefix (CP) of the serving cell, and the like. For example, when a CoMP cell candidate list is prepared through a v-shift of Cell-specific Reference Signal (CRS) among the network parameters, the CoMP cell candidate list is prepared through a method of including cells having the same v-shift of Cell-specific Reference Signal (CRS) in the CoMP cell candidate list.

Next, if the CoMP cell candidate list is prepared, then the serving base station transmits the CoMP cell candidate list to the terminal (S330).

The terminal that has received the CoMP cell candidate list measures communication environment information for cells included in the CoMP cell candidate list (S340).

The terminal determines CoMP execution cells based on the measured communication environment information (S350).

As described above, the method of configuring a CoMP cell candidate list on the basis of a specific parameter of the adjacent base station can solve the deterioration of channel estimation performance caused by the uncertainty of the number of antenna in an adjacent cell compared to a case of configuring a CoMP cell candidate list on the basis of a measurement value of the terminal.

Next, according to an embodiment of the present invention, a method of preparing a CoMP cell candidate list and then immediately determining a CoMP execution cell without configuring a CoMP cell list will be described.

In this embodiment, it is a case where a list initially given to the terminal from the base station becomes an adjacent cell list to perform CoMP for itself instead of becoming a CoMP cell candidate list, and thus the terminal is not required to measure additional communication environment information for the received cells and report it to the base station, and the serving base station is not required to additionally determine CoMP execution cells and transmit them to the terminal.

In other words, the terminal that has received an adjacent cell list to perform CoMP by the foregoing procedure performs CoMP on the basis of the list and reports it to the serving base station. The serving base station that has received the report transmits PMI information to be limited or recommended on the basis of the information on adjacent cells received from the terminal.

In this embodiment, the serving base station immediately determines a CoMP cell candidate list to perform CoMP based on the communication environment information of adjacent cells measured by the terminal without performing the process of preparing a CoMP cell candidate list during the operation of the foregoing embodiment.

Figure 4:
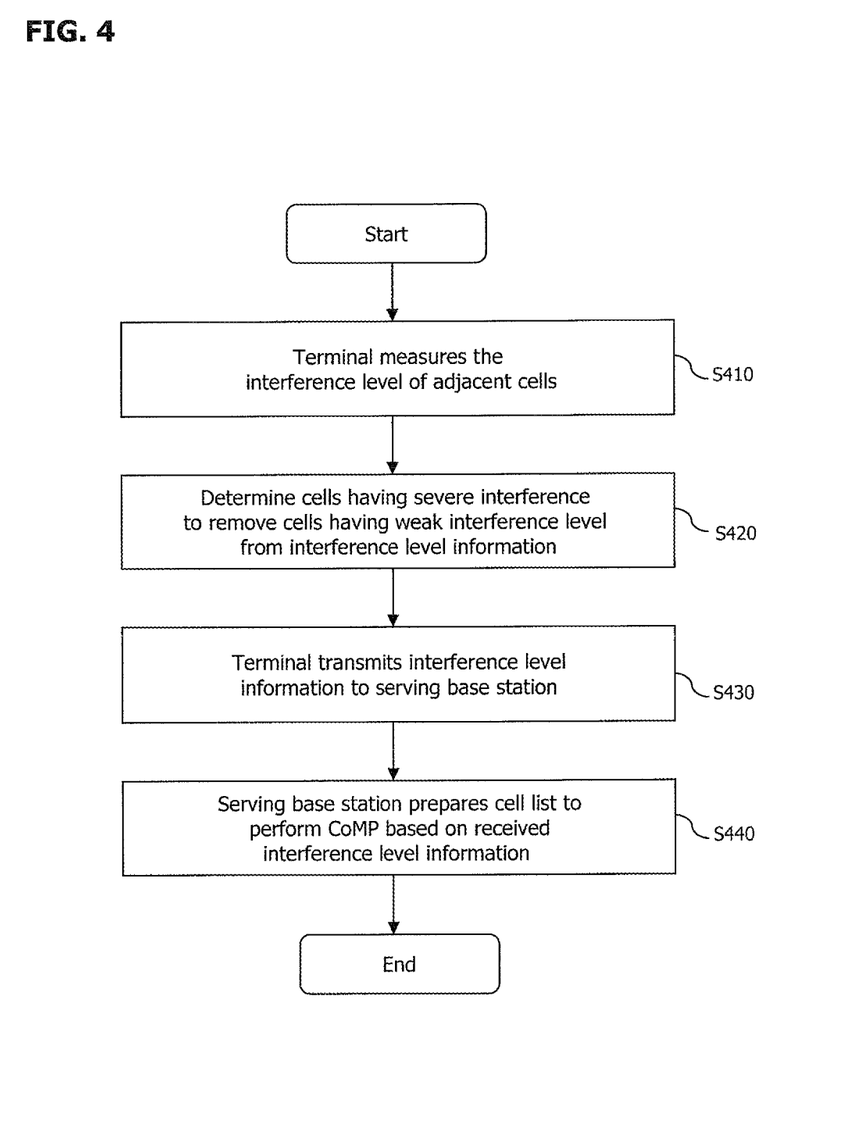
FIG. 4 is a flow chart for explaining a method of allowing the serving base station to immediately configure a CoMP

Hereinafter, a method of allowing the serving base station to immediately configure a CoMP cell list will be described with reference to FIG. 4. FIG. 4 is a flow chart for explaining a method of allowing the serving base station to immediately configure a CoMP cell list using an adjacent cell measurement value by a terminal according to an embodiment of the present invention.

According to FIG. 4, first, the terminal measures an interference level at which adjacent cells give an effect on the terminal through the measurement for adjacent cells (S410). At this time, values used to measure the interference level may include reference symbol received power (RSRP), reference symbol received quality (RSRQ), a reference signal strength indicator (RSSI), a carrier to interference plus noise ratio (CINR), a signal to interference noise ratio (SINR), a propagation delay (PD), and the like.

Then, the terminal determines adjacent cells having a severe interference based on the measured interference level while removing an adjacent cell having no interference or a weak interference level from information on the interference level of adjacent cells (S420). For example, the terminal may compare a signal received from the serving cell with reference symbol received quality (RSRQ), a reference signal strength indicator (RSSI), determining it has a severe interference from the relevant adjacent cell when the latter signal is greater than the former. Furthermore, the terminal may determine an interference level using a propagation delay (PD) measured for the adjacent cell.

Next, the terminal transmits information on the measured interference level from an adjacent cell (S430). The transmitted information may include at least one measurement value and cell ID. Here, the cell ID may use at least one of a physical cell ID and a global cell ID.

The serving base station that has received interference level information on an adjacent cell prepares a CoMP execution cell list on the basis of that information (S440).

However, the foregoing method may be modified in various ways. For example, when the base station determines a CoMP execution cell list among cells in the CoMP cell candidate list, it may be also possible to use a method of directly determining the number of cells to perform CoMP and the cell ID to determine a CoMP cell list without the communication environment measurement information of the terminal.

As described above, the serving base station can receive information from the terminal to determine a CoMP execution cell list, but the present invention will not be limited to this, and the terminal may directly determine a CoMP execution cell list. In other words, the terminal may directly determine a CoMP execution cell list by an interference level based on communication environment information measured for adjacent cells. In this manner, when a CoMP execution cell list is determined by a terminal, the determined CoMP execution cell list may be transferred to the serving base station by the terminal afterwards.

In this manner, when the terminal determines a CoMP execution cell list by taking an interference level from the adjacent cell into consideration, the CoMP execution cell list may be determined by using a method in which the terminal receives a threshold value and the like in advance from the serving base station, and compares it with the interference level information measured by the terminal from the adjacent cell to determine the CoMP execution cell list.

On the other hand, as described above, when the CoMP execution cell list is determined by the base station, the base station should transfer a cell ID or cell ID index which is information for a CoMP execution cell list to the terminal, thereby allowing the terminal to perform measurement on an adjacent cell or demodulation of a signal.

Furthermore, when adjacent cells performing CoMP have a different number of antennas from that of the serving cell or transmit data to another rank, the serving base station may also notify the number of antennas in adjacent cells as well as information on rank to the terminal. According to circumstances, subsequent to configuring a CoMP cell list, information such as a PMI index of the adjacent cell, modulation and coding scheme (MCS) related control information, Hybrid Automatic Repetition Request (HARQ) related control information (for example, a number of HARQ executions, a new data indicator (NDI) and a redundancy version (RV)) and the like may be transmitted to the terminal.

The information may be transmitted through higher layer signaling capable of notifying the ID information or cell ID index of adjacent cells corresponding to the CoMP cell list whenever reconfiguring a cell list to perform CoMP or periodically.

In addition, it may be transmitted through L1/L2 control signaling designed to distinguish a Physical Downlink Control Channel (PDCCH) in a DCI format type configured with control information. In this method, in the aspect of reusing the existing DCI format, some fields on the DCI format may be used to transmit the information, and the other fields in the form of zero-padding or filling an arbitrary value. For the information transmitted to the terminal, all information required for adjacent cells may be notified or only information with portions different from that of the serving cell may be notified.

On the other hand, in configuring a CoMP cell list, the base station may index a specified number of cells having a high interference level on the basis of the measurement of the terminal for adjacent cells in the highest interference level order or in the original cell ID order to configure a CoMP cell list. Otherwise, the terminal may receive information on a CoMP cell list in advance from the base station, and arrange it in the highest interference level order by communication environment measurement for adjacent cells, thereby determining the order of adjacent cells in the CoMP cell list.

Figure 5:
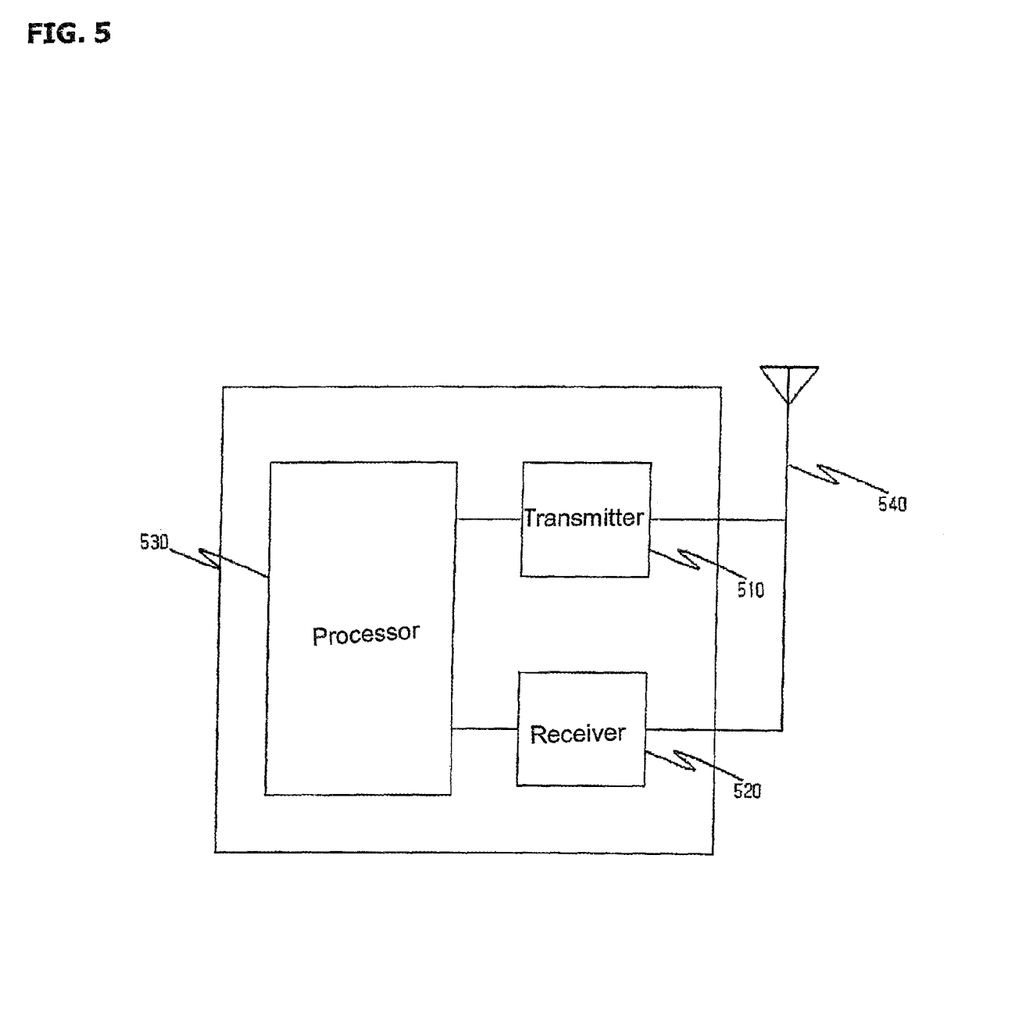
FIG. 5 is a block diagram illustrating a wireless communication apparatus for performing coordinated multi-point transmission in a multi-cell environment according to an embodiment of the present invention.

FIG. 5 is a block diagram illustrating a wireless communication apparatus for performing coordinated multi-point transmission in a multi-cell environment according to an embodiment of the present invention.

Referring to FIG. 5, an apparatus for performing coordinated multi-point transmission in a multi-cell environment may include a transmitter 510 configured to transmit data to a serving base station and an adjacent base station, a receiver 520 configured to receive data from the serving base station and adjacent base station, a processor 530 configured to control the data transmission and reception of the transmitter and receiver, and an antenna 540.

First, the transmitter 510 allows a base station of the serving cell to transmit a command for instructing a terminal to collect first communication environment measurement information on adjacent cells through the antenna 540, and the receiver 520 allows the base station of the serving cell to receive the communication environment measurement information on adjacent cells from the terminal through the antenna 540, and the processor 530 prepares a candidate cell list to perform coordinated multi-point (CoMP) transmission based on the information.

The transmitter 510 allows the base station of the serving cell to transmit the prepared candidate cell list to the terminal through the antenna 40 and transmits a command for instructing to collect second communication environment measurement information on cells in the candidate cell list, and the processor 530 allows the base station of the serving cell to receive the second communication environment measurement information from the terminal and determines an adjacent cell to perform coordinated multi-point transmission on the basis of the received second communication environment measurement information, and the transmitter allows the base station of the serving cell to transmit information on the determined adjacent cells to the terminal.

According to the present invention as described above, a cell to perform coordinated multi-point (CoMP) transmission among a plurality of cells adjacent to the terminal may be limited, thereby preventing an overhead as well as effectively reducing interference phenomenon due to adjacent cells.

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims.

What is claimed is:

1. A coordinated multi-point (CoMP) transmission execution cell determination method in a wireless communication system for performing coordinated multi-point transmission in a multi-cell environment, the method comprising:
determining, by a serving base station, a terminal to perform the CoMP transmission among terminals in a serving cell, the determining the terminal to perform the CoMP transmission among the terminals in the serving cell being performed by the serving cell based on signals from the terminals regarding channel quality in the serving cell;
directing, by the serving base station, the terminal, determined to perform the CoMP transmission, to collect first measurement information on adjacent cells;
receiving the first measurement information on adjacent cells from the terminal to prepare a candidate cell list to perform the CoMP transmission based on the first measurement information;
transmitting the prepared candidate cell list to the terminal and instructing the terminal to collect second measurement information on candidate cells included in the candidate cell list to perform coordinated multi-point transmission;
receiving the second measurement information from the terminal and determining adjacent cells to perform coordinated multi-point transmission in a range of predetermined number of cells based on the received second measurement information; and
transmitting information on the determined adjacent cells to the terminal.

2. The method of claim 1, wherein the determining a terminal to perform coordinated multi-point transmission determines it using at least one of a terminal having no good channel quality through a channel quality indicator (CQI), a terminal with a severe interference level through interference level information on adjacent cells, and handover request information.

3. The method of claim 1, wherein:
the first measurement information comprises at least any one of information and cell ID of a precoding matrix index (PMI), a PMI for joint processing, a channel quality indicator (CQI), reference symbol received power (RSRP), reference symbol received quality (RSRQ), a reference signal strength indicator (RSSI), a carrier to interference plus noise ratio (CINR), a signal to interference noise ratio (SINR), and a propagation delay (PD); and
the second measurement information is any one of a precoding matrix index (PMI), a PMI for joint processing, a channel quality indicator (CQI), reference symbol received power (RSRP), reference symbol received quality (RSRQ), a reference signal strength indicator (RSSI), a carrier to interference plus noise ratio (CINR), a signal to interference noise ratio (SINR), and a propagation delay (PD).

4. The method of claim 1, wherein the range of predetermined number of cells in the determining an adjacent cell to perform coordinated multi-point transmission is a maximum number of cells capable of performing coordinated multi-point transmission or a number of cells determined on the basis of a predetermined maximum number of cells and a threshold value.

5. The method of claim 1, wherein:
the terminal to perform the CoMP transmission among terminals included in the serving cell is determined considering a network parameter, and
the network parameter comprises at least any one of an adjacent cell having the same v-shift of Cell-specific Reference Signal (CRS), an adjacent cell having the same number of antennas, an adjacent cell having the same rank, an adjacent cell having the same v-shift of Demodulation Reference Signal (DRS), an adjacent cell having a close geostrategic location, and an adjacent cell for which the propagation delay (PD) is less than a cyclic prefix (CP) of the serving cell.

6. The method of claim 1, wherein the determining the terminal to perform the CoMP transmission among the terminals in the serving cell is based on a predetermined ratio of terminals located at an edge of the serving cell.

7. A coordinated multi-point (CoMP) transmission execution apparatus in a wireless communication apparatus for performing coordinated multi-point transmission in a multi-cell environment, the apparatus comprising:
a transmitter configured to transmit data to a serving base station and an adjacent base station;
a receiver configured to receive data from the serving base station and adjacent base station; and
a processor configured to control the data transmission and reception of the transmitter and receiver,
wherein:
the processor determines a terminal to perform the CoMP transmission among terminals included in a serving cell, based on signals from the terminals regarding channel quality in the serving cell,
the transmitter allows a base station of the serving cell to transmit a command for instructing the terminal, determined to perform the CoMP, to collect first communication environment measurement information on adjacent cells,
the receiver allows the base station of the serving cell to receive the communication environment measurement information on adjacent cells from a terminal,
the processor prepares a candidate cell list to perform coordinated multi-point (COMP) transmission based on the communication environment information received from the terminal,
the transmitter allows the base station of the serving cell to transmit the prepared candidate cell list to the terminal and transmits a command for instructing to collect second communication environment measurement information on cells in the candidate cell list,
the processor allows the base station of the serving cell to receive the second communication environment measurement information from the terminal and determines adjacent cells to perform coordinated multi-point transmission in a range of predetermined number of cells on the basis of the received second communication environment measurement information, and
the transmitter allows the base station of the serving cell to transmit information on the determined adjacent cells to the terminal.

* * * * *